(12) United States Patent  
Leung et al.

(10) Patent No.: US 8,385,978 B2  
(45) Date of Patent: Feb. 26, 2013

(54) MULTI-FUNCTION WIRELESS APPARATUS

(75) Inventors: Hang Ching Jason Leung, Yuen Long (HK); Piu Bill Wong, Causeway Bay (CN)

(73) Assignee: FiMax Technology Limited, Georgetown (KY)

( * ) Notice: Subject to any disclaimer, the term of this patent is extended or adjusted under 35 U.S.C. 154(b) by 818 days.

(21) Appl. No.: 12/470,537

(22) Filed: May 22, 2009

(65) Prior Publication Data

US 2010/0296439 A1 Nov. 25, 2010

(51) Int. Cl.  
*H04M 1/00* (2006.01)

(52) U.S. Cl. ..................... 455/562.1; 370/334

(58) Field of Classification Search ............... 455/562.1; 370/338

See application file for complete search history.

(56) References Cited

U.S. PATENT DOCUMENTS

| 2004/0052227 A1* | 3/2004 | Judd et al. ............. 370/334 |
| 2005/0078624 A1* | 4/2005 | Shu et al. .............. 370/328 |
| 2007/0232359 A1* | 10/2007 | Pinheiro et al. ....... 455/562.1 |
| 2008/0090575 A1* | 4/2008 | Barak et al. ........... 455/444 |

* cited by examiner

*Primary Examiner* — Marcos Batista  
(74) *Attorney, Agent, or Firm* — Fulbright & Jaworski L.L.P.

(57) ABSTRACT

Systems and methods which provide a multi-function wireless node are shown. Multi-function wireless nodes of embodiments provide link completion infrastructure suited for a plurality of situations and environments, such as for repeaters, bridges, gateways, and APs. Embodiments provide a multi-function wireless node comprising a plurality of radios. Multi-function wireless nodes of embodiments further comprise a smart antenna system coupled to radios thereof and providing illumination within a service volume. The service volume of embodiments comprises a semi-spherical volume. Embodiments comprise a controller facilitating proper and/or optimal deployment and commissioning of the multi-function wireless node in each of a plurality of different link completion infrastructure forms. Embodiments further comprise a communication interface providing one or more information communication links in addition to those available through wireless links.

52 Claims, 7 Drawing Sheets

MULTI-FUNCTION WIRELESS APPARATUS

TECHNICAL FIELD

The invention relates generally to wireless communications and, more particularly, to systems and methods providing multi-function wireless communication solutions.

BACKGROUND OF THE INVENTION

The use of wireless communication links for providing information communication, such as for providing digital data communication, voice over Internet protocol (VoIP) communication, etc., has become increasingly widespread in recent years. For example, local area network (LAN) system administrators have increasingly relied upon wireless access points (APs), such as relatively short range APs providing communication in conformance with the Institute of Electrical and Electronic Engineers (IEEE) 802.11(a), (b), (g), and/or (n) standards (WiFi), to provide information communication to various nodes. Similarly, commercial communications providers and others have deployed similar APs, often adapted to illuminate a larger communication area than traditional WiFi APs, to provide metropolitan area network (MAN) coverage, wireless hotspots, etc. Some commercial communication providers and others have utilized other wireless technology, such as typically longer range base stations (BSs) providing communication in conformance with the IEEE 802.16-2004 (often referred to as 802.16d) and 802.16e-2005 (often referred to as 802.16e) standards (WiMax), to provide information to various nodes. Likewise, some commercial communication providers and others have utilized still other wireless technology, such as cellular communication network BSs providing information communication using the International Telecommunication Union (ITU) third generation (3G) or fourth generation (4G) IMT-2000 standards or the high speed packet access (HSPA) standards, to provide information to various nodes.

Wireless infrastructure deployment has not reached the point that truly ubiquitous wireless information communication coverage is provided, even within a defined area such as a city or even an office building. For example, all such technologies experience shadowing and other phenomena in particular situations which prevent, or otherwise render ineffective, communications with nodes in some portions of a desired service area. Additionally, some nodes for which providing information communication is desired may not be capable of communication with a particular AP or BS providing illumination of a service area. For example, a wireless enabled personal computer (PC) or personal digital assistant (PDA) may comprise a WiFi interface, although particular area in which wireless information communication is desired may be served only by a WiMax BS or a 3G BS.

Various different forms of link completion infrastructure, such as repeaters, bridges, gateways, etc., might be deployed to address particular instances where the wireless infrastructure deployment results in a gap in desired wireless information communication. Unfortunately, however, such link completion infrastructure is often deployed by non-technical or otherwise minimally trained personnel. Properly and, to a greater extent, optimally deploying and commissioning such link completion infrastructure is often complicated and/or requires an understanding of the network environment. Further exacerbating the difficulties in deployment of link completion infrastructure is the differences between various link completion infrastructure apparatuses, such as a repeater, bridge, and gateways. Often a particular apparatus must be selected for a situation and the personnel deploying and commissioning the apparatus must be knowledgeable with respect to that particular apparatus for successful deployment.

BRIEF SUMMARY OF THE INVENTION

The present invention is directed to systems and methods which provide a multi-function wireless node. Multi-function wireless nodes of embodiments of the invention provide link completion infrastructure suited for a plurality of situations and environments. For example, multi-function wireless nodes of embodiments of the invention facilitate their use as different forms of link completion infrastructure, such as a repeater, a bridge, a gateway, and an AP.

Embodiments of the invention provide a multi-function wireless node comprising a plurality of radios, such as a plurality of radio transceiver sets. The radios preferably operate in accordance with one or more widely utilized protocols, such as one or more of WiFi, WiMax, 3G, long term evolution (LTE), and/or satellite protocols, to readily facilitate information communication with a large population of nodes. Radios utilized according to embodiments of the invention are adapted to provide multi-protocol operation, such as IEEE 802.11(a), (b), (g), and (n), to facilitate node compatibility. Additionally or alternatively, radios utilized according to embodiments of the invention are adapted to provide multi-frequency operation, such as 2.4 GHz and 5 GHz, to facilitate node compatibility and/or to provide isolation between different information communication links.

Multi-function wireless nodes of embodiments of the invention further comprise a smart antenna system coupled to radios thereof and providing illumination (preferably both for transmit and receive information communication) within a service volume. For example, the service volume of embodiments of the invention comprises a semi-spherical volume which comprises a volume greater than that of a hemisphere but less than that of a sphere. Smart antenna systems of embodiments of the invention preferably provide a plurality of antenna beams for each radio of a multi-function wireless node. Such smart antenna systems may provide wide beams, narrow beams, fixed beams, adaptive beams, and combinations thereof according to embodiments of the invention. Aggregation of the antenna beams for each particular radio of a multi-function wireless node preferably provides coverage of the service volume for that radio according to embodiments.

Embodiments of a multi-function wireless node comprise a controller facilitating proper and/or optimal deployment and commissioning of the multi-function wireless node in each of a plurality of different link completion infrastructure forms, such as repeater, bridge, gateway, and AP. For example, a controller of an embodiment of the invention may operate to analyze information communication associated with each antenna beam (or some selected plurality of antenna beams) for each radio of a multi-function wireless node for determining a link completion infrastructure form to be assumed and/or to configure channel, frequency, radio, and/or antenna beam selections for properly and/or optimally providing a selected link completion infrastructure form.

Multi-function wireless nodes of embodiments of the invention comprise a communication interface providing one or more information communication links in addition to those available through wireless links, or the primary wireless links, associated with the aforementioned radios and smart antenna system. For example, a multi-function wireless node may comprise a communication interface having one or more non-wireless network interface (e.g., Ethernet, public switched telephone network (PSTN), fiber optic, small computer system interface (SCSI), etc.). Additionally or alternatively, a multi-function wireless node may comprise a communication interface having one or more point-to-point type interface (e.g., universal serial bus (USB), IEEE 1394 serial interface (often referred to as "firewire"), IEEE 1284 parallel interface (often referred to as a "Centronics interface"), etc.). A multi-function wireless node may likewise comprise a communication interface having one or more additional or supplemental wireless interface (e.g., WiMax, 3G, LTE, satellite, etc.).

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWING

For a more complete understanding of the present invention, reference is now made to the following descriptions taken in conjunction with the accompanying drawing, in which.

DETAILED DESCRIPTION OF THE INVENTION

Directing attention to FIGS. 1A-1E, multi-function wireless node 110 of embodiments of the invention is shown. Multi-function wireless node 110 is adapted to provide link completion infrastructure suited for a plurality of situations and environments. For example, multi-function wireless node 110 of embodiments of the invention is adapted to provide repeater, bridge, gateway, and AP link completion infrastructure forms. Other embodiments may provide fewer, more, additional, or alternative link completion infrastructure forms in accordance with the concepts of the present invention.

Figure 1A:
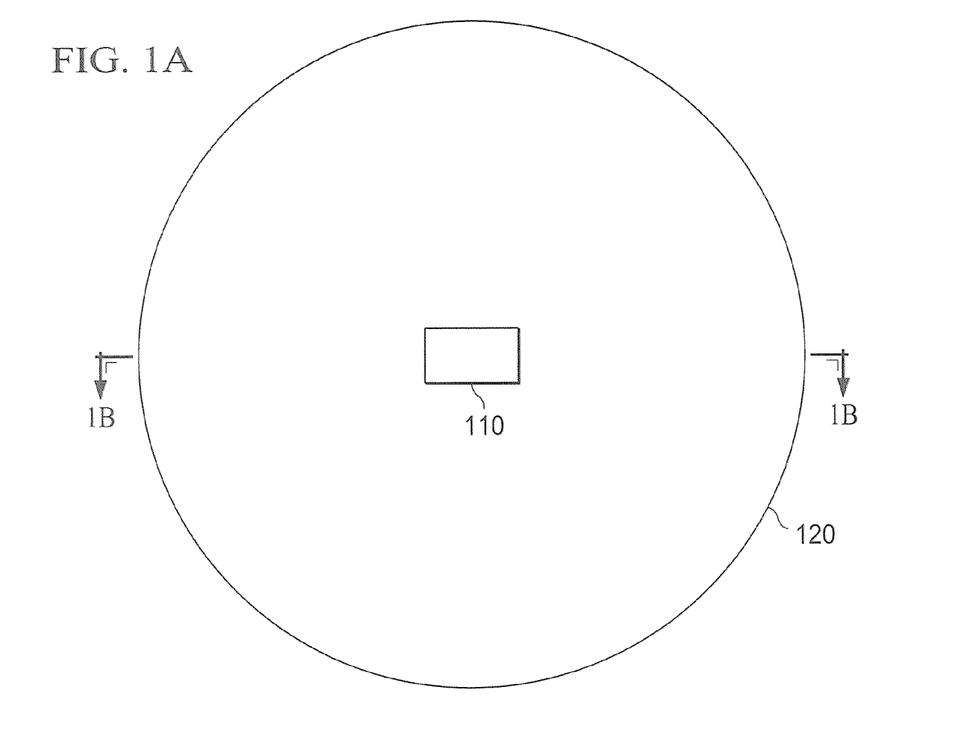
FIGS. 1A-1E show a multi-function wireless node of embodiments providing illumination of a service volume for information communication according to embodiments of the invention.
Figure 1B:
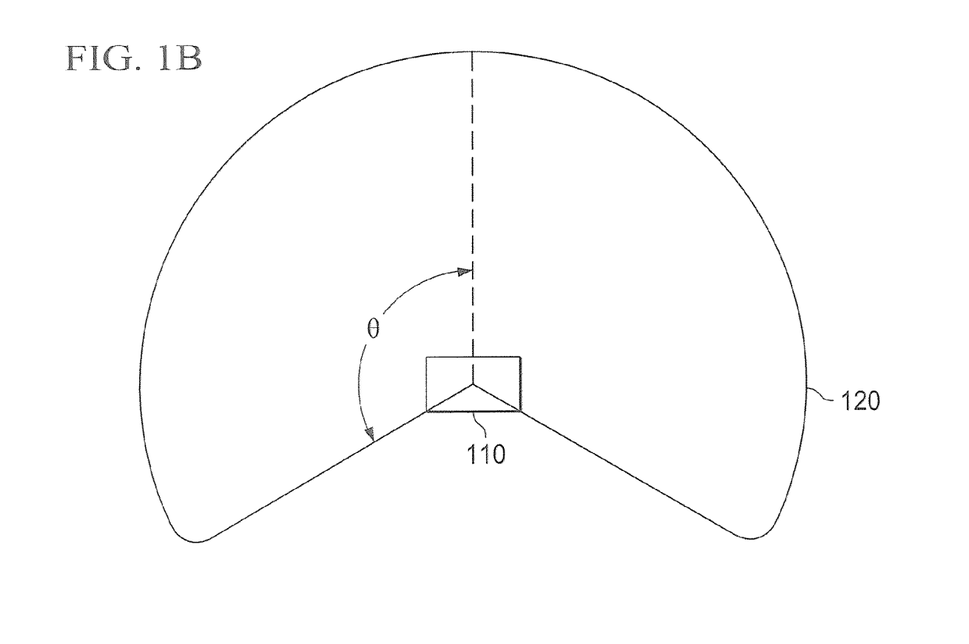

As illustrated in FIGS. 1A and 1B, multi-function wireless node 110 provides illumination within service volume 120 for providing wireless information communication within this service volume. Such wireless information communication illumination preferably facilitates both transmit and receive information communication, although perhaps using different antenna patterns for corresponding transmit and receive links.

According to a preferred embodiment of the invention, multi-function wireless node 110 is adapted to define service volume 120 as a semi-spherical volume (referred to herein as a semi-sphere) which comprises a volume greater than that of a hemisphere but less than that of a sphere. As can be seen in the illustrated embodiment as represented in the plan view of FIG. 1A, the semi-sphere provides illumination in 360° radially about multi-function wireless node 110. As can be seen in the illustrated embodiment as represented in the cross-sectional view of FIG. 1B, the semi-sphere provides illumination in approximately 270° (e.g., θ is approximately 135°) axially about multi-function wireless node 110.

A semi-spherical service volume as represented in FIGS. 1A and 1B provides a desirable service volume with respect to multi-function wireless node 110 for a number of reasons. Such a semi-spherical service volume supports multiple operational configurations of the multi-function wireless node as well as provides flexibility in deployment and/or mounting. Multi-function wireless node 110 of embodiments is adapted to accommodate deployment in a number of different orientations and configurations. For example, multi-function wireless node 110 may be adapted for installation on a surface of a ceiling (e.g., disposed in an inverted or downward facing orientation), on a surface of a floor (e.g., disposed in a horizontal or upward facing orientation), on a surface of a wall (e.g., disposed in a vertical or profile orientation), on a surface of a table or other furnishing (e.g., disposed in a horizontal or upward facing orientation), on top of a pole, post, or other structure (e.g., disposed in a finial or crest orientation) attached to a horizontal pole, cantilevered member, or other structure (e.g., disposed on the top, bottom, side or end of a horizontal pole extending from a vertical structure such as a lamp post), and/or the like. The aforementioned semi-sphere provides illumination above, beside, and below multi-function wireless node 110, thereby providing desirable illumination in each of the foregoing orientations and configurations.

Deployment and mounting flexibility, as mentioned above, is illustrated in FIG. 1F. FIG. 1F shows an urban deployment example wherein the semi-spherical service volume of embodiments providing for in-building coverage using a street level lamp pole mounting configuration to cover multiple buildings and a wall mount configuration to cover an opposing building and/or the street level or other open areas.

Although it is desirable that a service volume provided by embodiments of the present invention provides illumination axially about a multi-function wireless node greater than 180°, axial illumination angles (the angle of service volume illumination axially about a multi-function wireless node) may differ from the 270° axial illumination angle mentioned above. Embodiments of the invention may utilize axial illumination angles selected so as to provide a service volume adapted to accommodate a selected variety of deployment orientations and configurations.

It should be appreciated that a service volume need not provide homogeneous, or even complete, illumination within the volume according to embodiments of the invention. For example, as will be better understood from the discussion which follows, where multiple antenna beams are aggregated to provide illumination of a service volume, various nulls, areas of reduced gain, etc. may be present. Nevertheless, such antenna beams may aggregate to substantially illuminate the service volume for use in accordance with the concepts described herein.

Figure 1C:
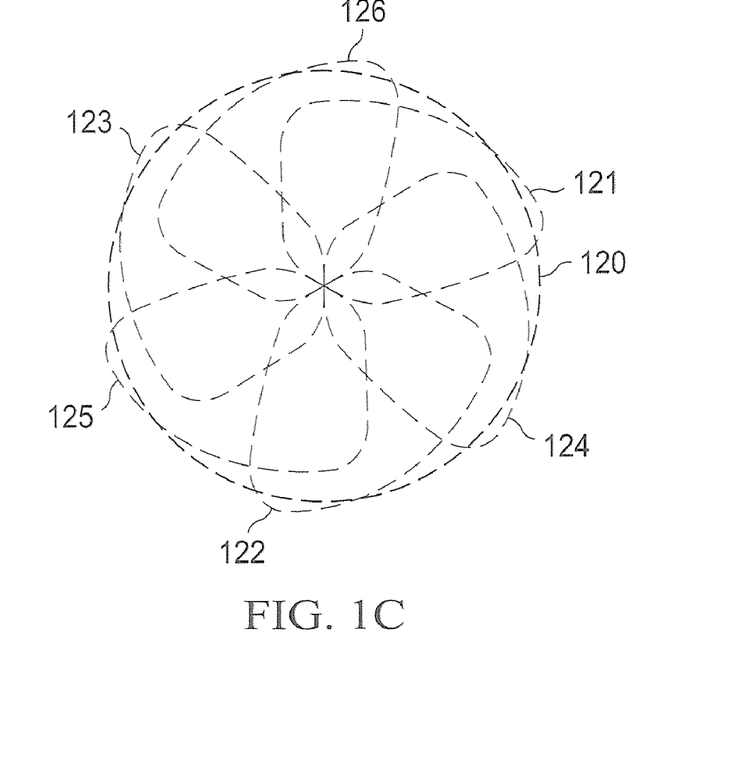

Directing attention to FIG. 1C, relatively wide (e.g., greater than or equal to 90° in the azimuth and/or elevation) antenna beams 121-126 of an embodiment aggregate to illuminate service volume 120. According to the illustrated embodiment, each of antenna beams 121-126 provides a radial illumination angle (the angle of service volume illumination radially about a multi-function wireless node) of less than 360° (e.g., approximately 120°) and an axial illumination angle of less than 270° (e.g. approximately 135°). It should be appreciated that, due to appreciable overlap among the antenna beams, antenna beams 121, 122, and 123 may be relied upon to provide substantially complete illumination of service volume 120 and likewise antenna beams 124, 125, and 126 may be relied upon to provide substantially complete illumination of service volume 120. Such overlapping subsets of antenna beams may be utilized with respect to a plurality of multi-function wireless node radios as discussed below. Aggregation of the antenna beams for each particular radio of a multi-function wireless node preferably facilitates illumination of the service volume for that radio according to embodiments.

Figure 1D:
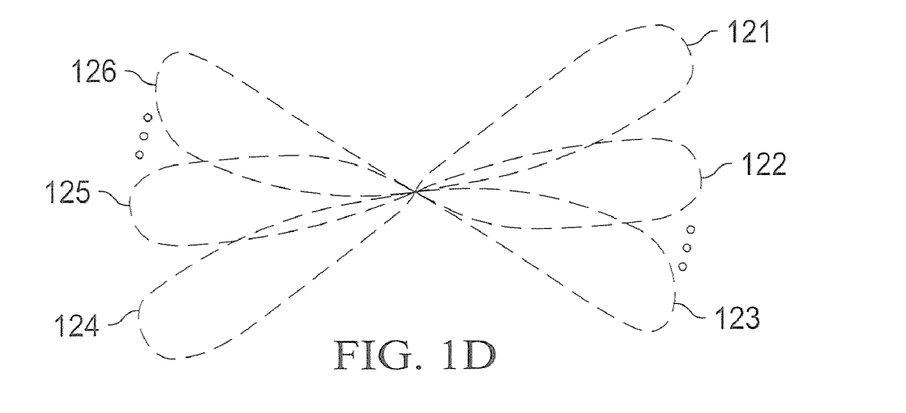
Figure 1E:
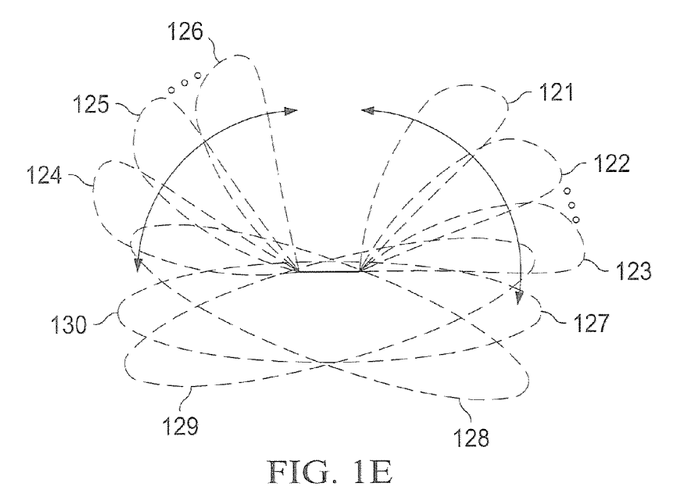
Figure 1F:
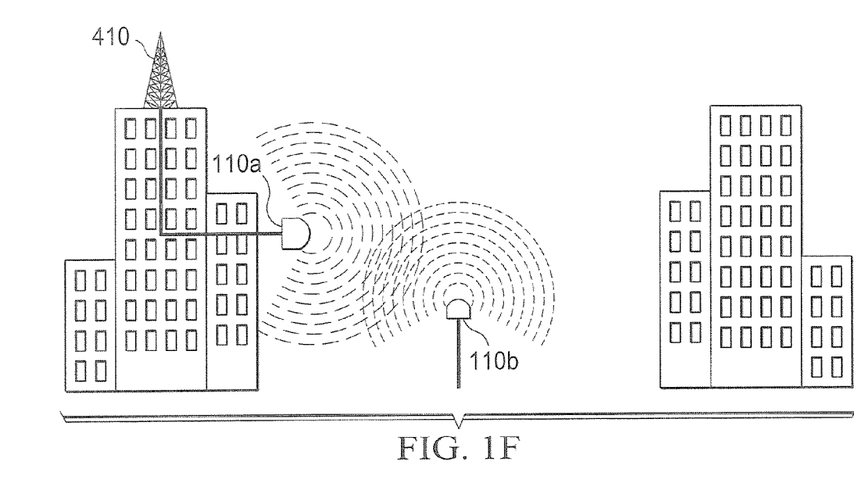
FIG. 1F shows an urban deployment of multi-function wireless nodes of embodiments of the invention.

Antenna beams used according to embodiments of the invention may be provided in shapes, sizes, and numbers different than that illustrated in FIG. 1C. For example, a plurality of relatively narrow (e.g., less than 90° in the azimuth and/or elevation) antenna beams may be utilized as shown in FIG. 1D. Such narrow antenna beams may be preferred to provide improved, high gain, relatively long distance connections, and/or the like (e.g., by limiting interference, increasing signal to noise ratios, providing high antenna gain, etc.), whereas more wide antenna beams, such as those shown in FIG. 1C may be preferred to provide broader area coverage, increased wireless signal access, improved trunking and/or the like (e.g., by illuminating a larger area, providing wireless coverage to a large number of wireless nodes, etc.). A large number of antenna beams, such as antenna beams 121-126 shown in FIG. 1D, provided with different elevation and azimuth angles may aggregate to provide illumination of service volume 120. Overlapping subsets of such antenna beams (e.g., antenna beams 121-123 and additional antenna beams not shown forming a first subset and antenna beams 124-126 and additional antenna beams not shown forming a second subset) may each be relied upon to provide substantially complete illumination of service volume 120. Antenna beams utilized according to embodiments may be provided using various techniques, including adaptive beam forming, fixed beam forming, switched beams, adaptive beam selection, etc.

There is no limitation that antenna beams be utilized to provide substantially complete illumination of service volume 120 according to embodiments of the invention. For example, multi-function wireless node 110 may be configured into various link completion infrastructure forms for which substantially complete illumination of service volume 120 is not desired. As one example, a repeater link completion infrastructure form may implement a sector coverage configuration using select antenna beams, as illustrated by antenna beams 121-123 of FIG. 1D providing a first sector and antenna beams 124-126 of FIG. 1D providing a second sector, to provide a link between two nodes (e.g., an AP or BS and a workstation). Such a sector configuration is preferably implemented through selection of appropriate ones of the antenna beams available for providing substantially complete illumination of service volume 120.

Although embodiments have been discussed above with respect to use of relatively wide antenna beams or the use of relatively narrow antenna beams, embodiments of the invention may utilize various combinations of antenna beam configurations. Directing attention to FIG. 1E, an embodiment wherein antenna beams 121-126 are provided in a relatively narrow beam configuration, as discussed above with respect to FIG. 1D, and antenna beams 127-130 are provided in a relatively wide beam configuration, as discussed above with respect to FIG. 1C, is shown. Such combinations of different antenna beam configurations may be utilized for facilitating particular link completion infrastructure forms of multi-function wireless node 110 according to embodiments of the invention.

Figure 2:
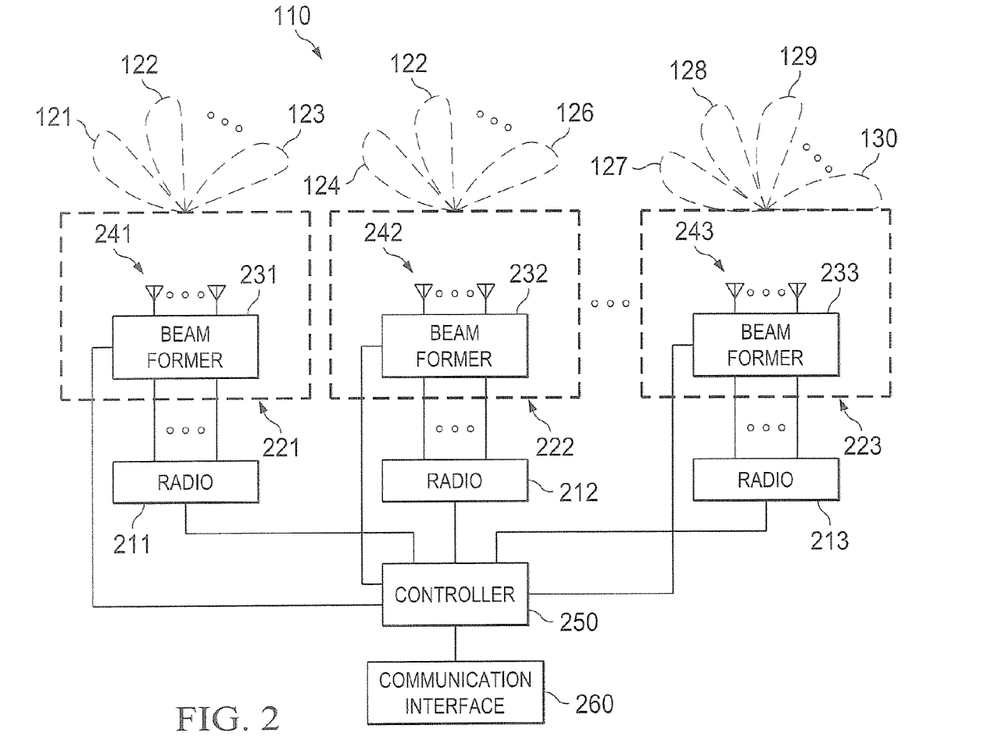
FIG. 2 shows detail with respect to a multi-function wireless node of embodiments of the invention.

FIG. 2 shows detail with respect to an embodiment of multi-function wireless node 110 of embodiments of the invention. Multi-function wireless node 110 of the illustrated embodiment comprising a plurality of radios, such as a plurality of radio transceiver sets, shown as radios 211-213. Although illustrated as single radio units, it should be appreciated that any or all of radios 211-213 of embodiments may comprise sets of radios (e.g., MIMO radio configurations) and/or be combined into a common unit (e.g., a single multi-radio unit). Radios 211-213 preferably operate in accordance with one or more widely utilized protocols, such as one or more of WiFi, WiMax, 3G, LTE, and/or satellite protocols, to readily facilitate information communication with a large population of nodes, such as PCs, PDAs, wireless LAN (WLAN) enabled cellular telephones, APs, etc. Moreover, radios 211-213 utilized according to embodiments of the invention are adapted to provide multi-protocol operation, such as IEEE 802.11(a), (b), (g), and (n), to facilitate node compatibility. Additionally or alternatively, radios 211-213 utilized according to embodiments of the invention are adapted to provide multi-frequency operation, such as 2.4 GHz and 5 GHz, to facilitate node compatibility and/or to provide isolation between different information communication links.

As illustrated in FIG. 2, radios 211-213 preferably comprise multiple wireless signal interfaces. For example, radios 211-213 of embodiments may provide diversity (e.g., polar, spatial, angular, and/or delay diversity) transmission and/or reception, multiple-input multiple-output (MIMO) transmission and/or reception, rake receiver reception, etc. through use of the aforementioned multiple wireless signal interfaces.

Referring still to FIG. 2, multi-function wireless node 110 of the illustrated embodiment further comprises a smart antenna system coupled to radios 211-213. Specifically, smart antenna apparatuses 221-223 are coupled to respective ones of radios 211-213 to provide antenna beams for illuminating service volume 120. In accordance with an embodiment of the invention, each of smart antenna apparatuses 221-223 are adapted to provide, or jointly provide, antenna beams for providing substantially complete illumination of service volume 120. That is, according to embodiments each radio and corresponding beam former may provide coverage of the entire service volume, each radio and corresponding beam former may aggregate to provide coverage of the service volume, or combinations thereof. The size, shape, orientation, and diversity of the various antenna beams, whether with respect to any particular smart antenna apparatus or with respect to the different smart antenna apparatuses, may be different as desired to provide link completion infrastructure forms according to the concepts described herein. The particular antenna beams implemented with respect to any radio of a multi-function wireless node, and the particular antenna beams implemented by a multi-function wireless node with respect to any node in communication therewith, may comprise various numbers of antenna beams of desirable sizes, shapes, orientations, and/or diversities, and combinations thereof. For example, a set of antenna beams, perhaps each having different size, shape, etc. attributes, selected as providing the "best" communication with a particular node may be implemented for a particular radio of a multi-function wireless node of an embodiment of the present invention to provide a MIMO communication link.

Each of smart antenna apparatuses 221-223 of the illustrated embodiment comprise a beam former and an antenna system. Specifically, smart antenna apparatus 221 comprises beam former 231 and antenna system 241, smart antenna apparatus 222 comprises beam former 232 and antenna system 242, and smart antenna apparatus 223 comprises beam former 233 and antenna system 243. Such beam formers and their corresponding antenna systems are preferably each utilized to provide a plurality of antenna beams of desired sizes, shapes, orientations, and/or diversities. As one illustrative example, beam former 231 and antenna system 241 may be utilized to provide antenna beam configurations corresponding to those of antenna beams 121-123, beam former 232 and antenna system 242 may be utilized to provide antenna beam configurations corresponding to those of antenna beams 124-126, and beam former 233 and antenna system 243 may be utilized to provide antenna beam configurations corresponding to those of antenna beams 127-130.

Antenna systems 241-243 may comprise various forms of antennas, such as single antennas, antenna arrays, etc. Antenna systems 241-243 may provide various forms of diversity, such as polar diversity, spatial diversity, angular diversity, delay diversity, etc. Accordingly, various ones of the antenna beams may implement diversity (e.g., polar diversity, spatial diversity, angular diversity, delay diversity, etc.) with respect to other antenna beams associated with the same radio and/or with respect to antenna beams associated with another radio. For example, antenna beams 121-123 associated with radio 211 may be provided with a first diversity attribute (e.g., vertical polarization) whereas beams 124-126 associated with radio 212 may be provided with a second diversity attribute (e.g., horizontal polarization), such as to provide orthogonality, or at least some level of isolation, with respect to the signals of each such radio.

Beam formers 231-233 may comprise various forms of beam forming circuitry, such as multiple fixed beam circuits, adaptive beam forming circuits, etc. Although illustrated as separate beam former units, it should be appreciated that any or all of beam formers 231-233 of embodiments may be combined into a common unit (e.g., a single beam former unit serving multiple radios).

Smart antenna systems provided using such beam formers and antenna systems may provide a plurality of fixed beams from which switched beam selection is made. Additionally or alternatively, smart antenna systems provided using such beam formers and antenna systems may provide a plurality of adaptive beams for dynamic beam forming. Accordingly, embodiments of the invention may provide fixed beams, adaptive beams, or a combination of fixed beams and adaptive beams as desired.

It should be appreciated that the particular number, size, shape, and orientation of the antenna beams provided by any such beam former and corresponding antenna system may be selected as desired to provide desired link completion infrastructure forms in accordance with the concepts of the present invention and thus are not limited to the examples given above. Moreover, embodiments of the invention operate to provide different numbers, sizes, shapes, and/or orientations of the antenna beams provided by the beam former and corresponding antenna system in accordance with a particular link completion infrastructure form invoked.

Although the embodiment as illustrated in FIG. 2 shows 3 radios and corresponding smart antenna apparatuses, it should be appreciated that any number of radios and smart antenna apparatuses may utilized according to embodiments of the invention. For example, an embodiment of a multi-function wireless node may comprise 2 radios and a corresponding smart antenna system providing illumination of a service volume as described herein. Similarly, as represented by the ellipsis in FIG. 2, embodiments may comprise 4, 5, etc. radios and/or 4, 5, etc. smart antenna apparatuses as desired to implement various link completion infrastructure forms.

Referring still to FIG. 2, multi-function wireless node 110 of the illustrated embodiment further comprises controller 250 adapted to facilitate proper and/or optimal deployment and commissioning of the multi-function wireless node in each of a plurality of different link completion infrastructure forms. For example, controller 250 of embodiments operates to analyze information communication associated with each antenna beam (or some selected plurality of antenna beams) associated with each of radios 211-213 to configure channel, frequency, radio, and/or antenna beam selections for properly and/or optimally providing a selected link completion infrastructure form. Accordingly, controller 250 of the illustrated embodiment is in communication with radios 211-213 and smart antenna apparatuses 221-223 to collect information therefrom and/or provide information thereto with respect to configuration and provisioning operations. Such information communication may additionally or alternatively be utilized with respect to monitoring ongoing operations, detecting errors or faults, reconfiguring the multi-function wireless node, etc.

Selection of a link completion infrastructure form to be invoked by multi-function wireless node 110 may be made manually or automatically. For example, a user may select (e.g., though setting a switch, inputting data to a register, etc.) a particular link completion infrastructure desired and controller 250 may thereafter operate to properly and/or optimally provide that selected link completion infrastructure form. Alternatively, controller 250 may analyze the environment in which it is placed, such as by analyzing the aforementioned information communication associated with each antenna beam and/or other information (e.g., the presence of other links, the number links detected, the types of links detected, the type of data detected, the volume of data detected, etc.) to automatically select an appropriate link completion infrastructure form for multi-function wireless node 110. Thereafter, controller 250 may operate to properly and/or optimally provide that selected link completion infrastructure form.

Referring still to FIG. 2, multi-function wireless node 110 of the illustrated embodiment further comprise communication interface 260. Communication interface 260 of embodiments provides one or more information communication links in addition to those available through wireless links associated with radios 211 and smart antenna apparatuses 221-223. For example, communication interface 260 may comprise one or more non-wireless network interface (e.g., Ethernet, PSTN, fiber optic, SCSI, etc.). Additionally or alternatively, communication interface 260 may comprise or more point-to-point type interface (e.g., USB, IEEE 1394 serial interface, IEEE 1284 parallel interface, etc.). A multi-function wireless node may likewise comprise a communication interface having one or more additional or supplemental wireless interface (e.g., WiMax, 3G, LTE, satellite, etc.).

Figure 3:
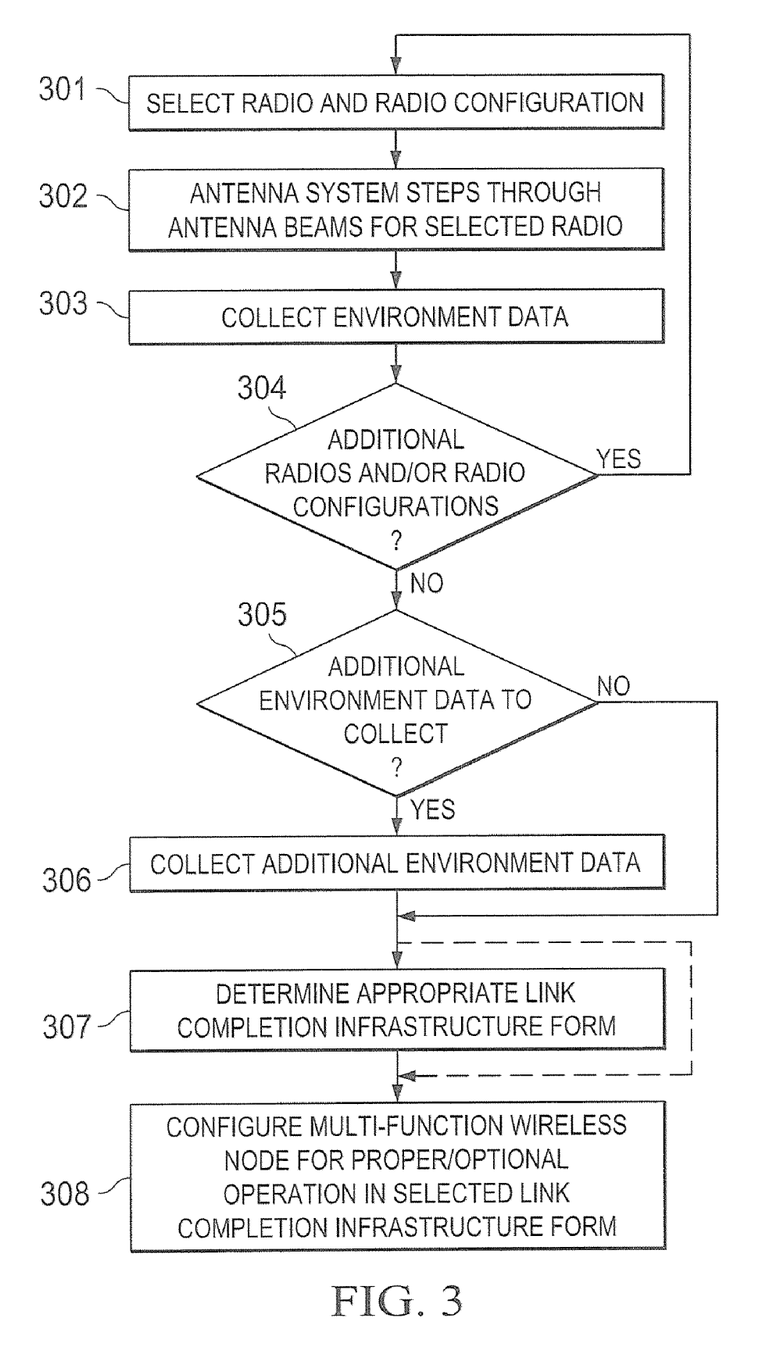
FIG. 3 shows operation of a multi-function wireless node to provide information communication according to embodiments of the invention.

Directing attention to FIG. 3, a flow diagram showing operation of multi-function wireless node 110 to provide a properly and/or optimally configured selected link completion infrastructure form is shown. At block 301 a particular radio of the plurality of radios is selected by controller 260 for use in collection of environment data to be used in configuring multi-function wireless node 110 for a selected link completion infrastructure form. As discussed above, radios of a preferred embodiment multi-function wireless node themselves provide various configurations, such as to communicate using different protocols, using different frequency bands etc. Accordingly, operation at block 301 of the illustrated embodiment further comprises selection by controller 260 of a configuration of the selected radio.

At block 302 the antenna system (e.g., antenna apparatus corresponding to the selected radio and/or radio configuration) is controlled by controller 260 to step through antenna beams for the selected radio and/or radio configuration. For example, controller 260 may control antenna apparatus corresponding to the selected radio to scan each of a plurality of antenna beams while the selected radio is controlled by controller 260 to transmit and/or receive signals. Such signals may be transmitted and/or received using multiple protocols, multiple channels, multiple frequency bands, etc. (e.g., using all protocols and frequencies of a multi-protocol and multi-frequency radio, or some selected subset thereof). Various environment data, such as the signals received, data which is received, signal level information, noise level information, interference information, responses detected in association with transmissions, nodes detected, etc., is collected by controller 260 at block 303.

It should be appreciated that the antenna beams utilized at block 302 may comprise all antenna beams available with respect to the selected radio. The use of all such antenna beams may be desired to give a very complete view of the environment, although perhaps at the expense of requiring appreciable time to invoke each such antenna beam. Alternatively, the antenna beams utilized at block 302 may comprise a subset of antenna beams available with respect to the selected radio. The use of such subsets of antenna beams may be desired to facilitate more rapid configuration and provisioning operation, although at the expense of giving a less complete view of the environment. Where selection of a particular link completion infrastructure form has been made a priori, such as through manual selection by a user, the use of such subsets of antenna beams may be selected for the particular link completion infrastructure form to more rapid configuration and provisioning operation while giving a substantially complete view of aspects of the environment relevant to the selected link completion infrastructure form. The use of a subset of antenna beams may be further be desirable with respect to embodiments implementing adaptive beam forming techniques because such embodiments may otherwise be capable of forming a nearly infinite number of antenna beams. A subset of antenna beams providing suitable coverage (e.g., aggregating to substantially illuminate the service volume or a selected portion thereof, providing partially overlapping coverage of the service volume or a selected portion thereof, etc.) may thus be utilized by such embodiments.

At block 304 a determination is made as to whether there are additional radios and/or radio configurations for which environment data is to be collected. If there are additional radios and/or radio configurations for which environment data is to be collected, processing according to the illustrated embodiment returns to block 301 whereat a next radio and/or radio configuration is selected. However, if there are no additional radios and/or radio configurations for which environment data is to be collected, processing according to the illustrated embodiment proceeds to block 305.

It should be appreciated that, although the embodiment illustrated in FIG. 3 shows processing of each selected radio and radio configuration serially to simplify the concepts described, there is no limitation with respect to the present invention providing the selection of radios, radio configurations, antenna beam forming, and/or environment data serially or in any other order. For example, embodiments of the invention may operate to collect environment data with respect to a plurality of radios and/or radio configurations in parallel.

At block 305 a determination is made as to whether there is additional environment data to collect to be used in configuring multi-function wireless node 110 for a selected link completion infrastructure form. For example, if communication interface 260 is coupled to a network or other link, environment data regarding that link may be collected by controller 250 a block 306 according to embodiments of the invention. However, if no additional environment data is to be collected, processing according to the illustrated embodiment proceeds to block 307.

At block 307 of the illustrated embodiment controller 250 processes and/or analyzes the collected environment data to determine an appropriate link completion infrastructure form for multi-function wireless node 110. For example, controller 250 may determine that the collected environment data shows that the environment includes an AP and multiple workstations or other terminal nodes and thus selects a repeater link completion infrastructure form. Similarly, controller 250 may determine that the collected environment data shows that the environment includes multiple APs and multiple workstations or other terminal nodes and thus selects a repeater with backhaul capability link completion infrastructure form, such as to provide links between APs. Controller 250 may determine that the collected environment data shows that the environment includes a BS (perhaps using a bridge adapter coupled to communication interface 260) and an AP and/or workstation or other terminal node and thus selects a bridge link completion infrastructure form. As another example, controller 250 may determine that the collected environment data shows that the environment includes a BS (e.g., a cellular telecommunication network BS) and a LAN (perhaps each using communication interface 260) and thus selects a gateway link completion infrastructure form. Controller 250 may determine that the collected environment data shows that the environment includes a LAN (perhaps using communication interface 260) and multiple workstations or other terminal nodes and thus selects an AP link completion infrastructure form.

Operation of controller 250 to determine an appropriate link completion infrastructure form is optional according to embodiments of the invention. For example, a user may select a desired link completion infrastructure form, such as prior to initial operation of block 301, if desired. Thus processing may proceed from block 305 to block 308 (as shown by the dotted line), wherein attributes of the multi-function wireless node (e.g., antenna beam selection and/or configuration, radio assignments, channel selection, etc.) are configured in accordance with the collected environment data to provide the selected link completion infrastructure form according to embodiments of the invention. Alternatively, a user may provide some information, such as the number of radios to be used, particular channels and/or frequencies to be used, antenna beam pattern parameters, numbers of antenna beams to be used, number and/or types of links to be established, etc., and operation of controller 250 at block 307 may determine an appropriate link completion infrastructure form, or some portion thereof, using the aforementioned user data, environmental data, and/or other available data.

It should be appreciated that, although exemplary embodiments are mentioned above with reference to selection of a particular completion infrastructure form, embodiments of the invention may operate to provide multiple such completion infrastructure forms using one or more multi-function wireless node. For example, by appropriately configuring various radios and smart antenna systems, embodiments of the invention may provide both a bridge link completion infrastructure form and an AP link completion infrastructure form. Of course, other combinations of completion infrastructure forms may be provided according to embodiments of the invention.

At block 308 controller 250 configures components of multi-function wireless node 110 for proper and/or optimal operation in the selected link completion infrastructure form. For example, controller 250 may select particular radios, radio configurations, and antenna beams for providing certain links of the selected link completion infrastructure form. As one example, where a repeater link completion infrastructure form is selected, a first radio may be selected to provide a link with a detected AP using one or more selected antenna beams and a second radio may be selected to provide illumination throughout a service volume to accommodate various workstations or other terminal devices. According to embodiments of the invention, a first radio configuration (e.g., 5 GHz communication band selection) is selected for use with the first radio and a second radio configuration (e.g., 2.4 GHz communication band selection) is selected for use with the second radio. Such selections may operate to provide orthogonality with respect to the communication of each radio as well as to accommodate desired information communication (e.g., a larger percentage of workstations and other terminal equipment are capable of communication in the 2.4 GHz band whereas a large number of APs are capable of communication in the 5 GHz band, thus providing an optimized configuration in many situations). Additionally or alternatively, embodiments of the invention may utilize one or more relatively narrow antenna beams providing communication with an AP in order to facilitate increased communication link lengths, increased information communication rates, decreased interference, and/or the like. Whereas, one or more relatively wide antenna beams illuminating the service volume may be utilized to provide communication with workstations and other terminal equipment in order to facilitate substantially complete coverage of the service volume, to accommodate mobile devices, and/or the like.

It should be appreciated that controller 250 providing the foregoing operation may be provided as one or more processor-based systems operating under control of instruction sets defining operation as described herein. For example, processor-based systems having a central processing unit (CPU), memory (e.g., random access memory (RAM), disk drive memory, optical drive memory, etc.), and appropriate input/output interfaces may be programmed with instruction sets to provide controller 250 of embodiments operable as described herein. Additionally or alternatively, controller 250 may comprise special purpose circuitry, such as application specific integrated circuits (ASICs), programmable gate arrays (PGAs), etc., configured to provide operation as described herein.

To aid in understanding the concepts of the present invention, several exemplary link completion infrastructure form configurations for a multi-function wireless node of embodiments of the invention are provided below. It should be appreciated that the examples given are not intended to limit the concepts described herein, but rather to provide more concrete examples of embodiments of the invention.

Figure 4:
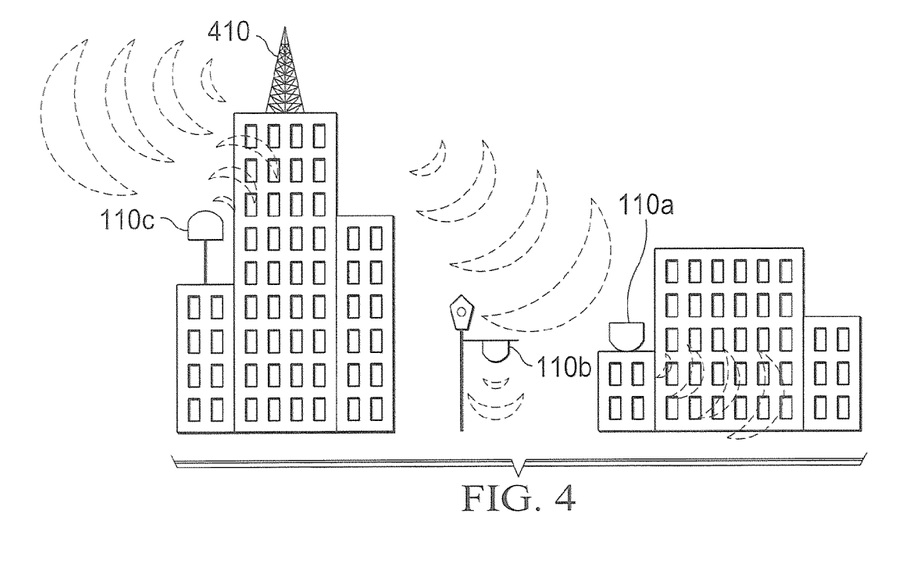
FIG. 4 shows a repeater link completion infrastructure form configuration of a multi-function wireless node according to embodiments of the invention.

Directing attention to FIG. 4, a repeater link completion infrastructure form configuration is shown providing extension of wireless outdoor coverage to an indoor environment and other areas otherwise not served, or inadequately served, by a wireless network. Specifically, multi-function wireless nodes 110a and 110c of FIG. 4 receive signals from AP 410, providing WiFi infrastructure, in the 2.4 GHz or 5 GHz bands and repeats the signal indoors while multi-function wireless node 110b of FIG. 4 receives signals from AP 410 in the 2.4 GHz or 5 GHz bands and repeats the signal in an area shadowed from signals of AP 410. To facilitate this exemplary embodiment, multi-function wireless node 110a is preferably placed near an external doorway or window in order to readily connect to AP 410. In this exemplary embodiment, multi-function wireless node 110b is disposed upon a structure, such as the bottom of a horizontal member extending from a lamp post, illuminated by AP 410 and in an orientation to view of a shadowed area to be provided service. Similarly, multi-function wireless node 110c of this exemplary embodiment is disposed upon a structure, such as the top of a lamp post or antenna mast, illuminated by AP 410 and in an orientation to view an area of a building to be provided service. The backhaul links (the links between multi-function wireless nodes 110a-110c and AP 410) and access links (the links between multi-function wireless nodes 110a-110c and the workstations or other terminal devices it serves (not shown)) are preferably performed on separate band/channels (5/2.4 GHz or 2 non-overlapping channels in 2.4 GHz).

Various configuration selections for a multi-function wireless node of the foregoing example are shown in the table below. In the below table, the 2 and 3 radio columns show different configurations which may be selected depending upon the number of radios utilized by the multi-function wireless node and the fixed and adaptive antenna system rows show different configurations which may be selected depending upon the antenna system utilized by the multi-function wireless node. The example illustrated by the below table assumes a 3 port radio, such as an 802.11n radio having 3 antenna ports.

|  | 2 Radio Multi-Function Wireless Node | 3 Radio Multi-Function Wireless Node |
| --- | --- | --- |
| Backhaul Radio | 1 802.11(n) 2.4/5 GHz radio | 1 802.11(n) 2.4/5 GHz radio |
| Access Radio | 1 802.11(n) 2.4 GHz radio | 2 802.11(n) 2.4 GHz radios |
| Fixed Beam Antenna System | 3 dual band single pole antennas (for access) 3 dual band single pole antennas (for backhaul) | 6 dual band single pole antennas (for access) 1 panel antenna (for backhaul 5 GHz) |
| Adaptive Beam Antenna System | 1 dual band 3 scan beam antenna set (for access) 1 dual band 3 scan beam antenna set (for backhaul) | 2 dual band 3 scan beam antenna sets (for access) 1 panel antenna (for backhaul 5 GHz) |

Figure 5:
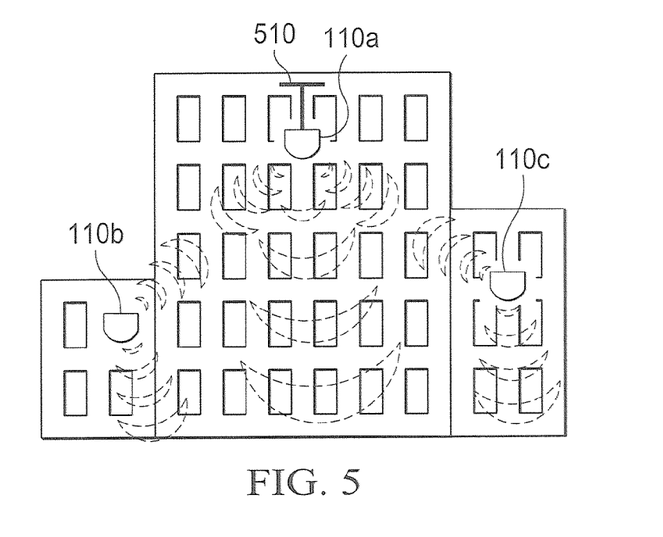
FIG. 5 shows an AP with backhaul link completion infrastructure form configuration of multi-function wireless nodes according to embodiments of the invention.

Directing attention to FIG. 5, an AP with backhaul link completion infrastructure form configuration is shown providing mesh nodes for indoor coverage. In this example, each of multi-function wireless nodes 110*a*-110*c* operate to automatically connect to each other in order to find a network exit point (shown here as network 510 coupled to multi-function wireless node 110*a*) to pass the traffic to. Algorithms of controllers 250 of each multi-function wireless node 110*a*-110*c* preferably includes a common mesh mechanism, such as self-healing, best path searching, etc. For the 3 radio design, embodiments use 2 802.11(n) 2.4/5 GHz radios to enhance the mesh connectivity such that the hop distance increases while latency is reduced. In addition, similar to the previous example, mesh and access connection are preferably performed on separate band/channels (5/2.4 GHz or 2 non-overlapping channels in 2.4 GHz).

|  | 2 Radio Multi-Function Wireless Node | 3 Radio Multi-Function Wireless Node |
| --- | --- | --- |
| Backhaul Radio | 1 802.11(n) 2.4/5 GHz radio | 2 802.11(n) 2.4/5 GHz radio |
| Access Radio | 1 802.11(n) 2.4 GHz radio | 1 802.11(n) 2.4 GHz radio |
| Fixed Beam Antenna System | 3 dual band single pole antennas (for access) 3 dual band single pole antennas (for backhaul) | 6 dual band single pole antennas (for backhaul) 1 omni antenna (for access 2.4 GHz) |
| Adaptive Beam Antenna System | 1 dual band 3 scan beam antenna set (for access) 1 dual band 3 scan beam antenna set (for backhaul) | 2 dual band 3 scan beam antenna sets (for backhaul) 1 omni antenna (for access 2.4 GHz) |

Figure 6:
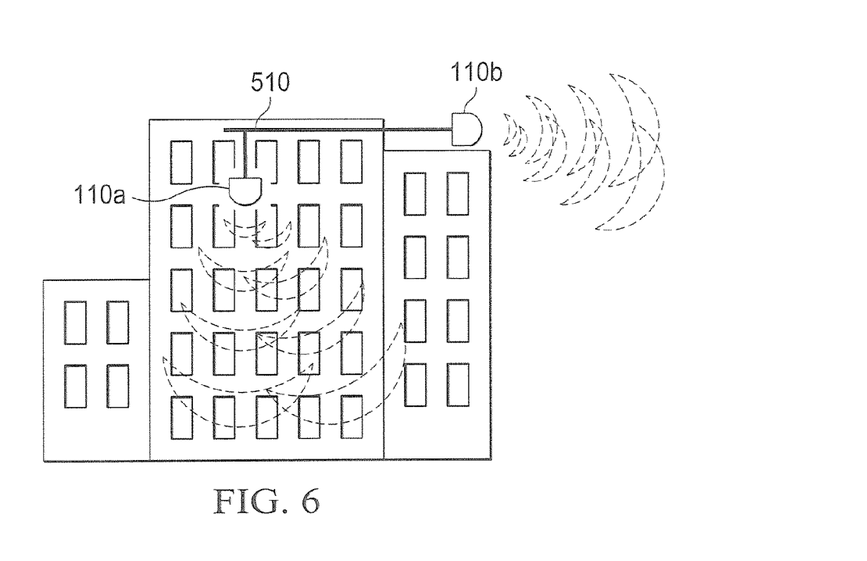
FIG. 6 shows an AP link completion infrastructure form configuration of multi-function wireless nodes according to embodiments of the invention.

Directing attention to FIG. 6, an AP link completion infrastructure form configuration is shown providing illumination of one or more service volumes. In this example, the radios of each of multi-function wireless nodes 110*a* and 110*b* are used simultaneously as access radios for providing access to network 510. Such radios can be joined together to provide a better coverage to all wireless clients or used as separate access points on different spectrum (e.g., 2.4/5 GHz or different 2.4 GHz channels) to provide better capacity.

|  | 2 Radio Multi-Function Wireless Node | 3 Radio Multi-Function Wireless Node |
| --- | --- | --- |
| Backhaul Radio | N/A | N/A |
| Access Radio | 2 802.11(n) 2.4 GHz radios | 2 802.11(n) 2.4 GHz radios 1 802.11(n) 5 GHz radio |
| Fixed Beam Antenna System | 6 dual band single pole antennas (for access) | 6 dual band single pole antennas (for access) 1 omni antenna (for access 5 GHz) |
| Adaptive Beam Antenna System | 2 dual band 3 scan beam antenna sets (for access) | 2 dual band 3 scan beam antenna sets (for access) 1 omni antenna (for access 5 GHz) |

Figure 7:
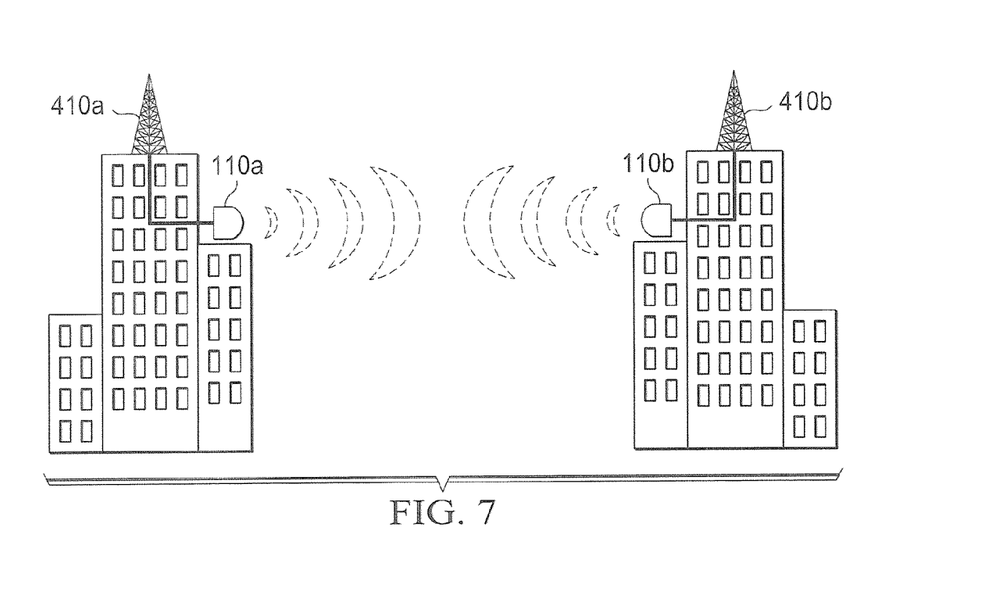
FIG. 7 shows a gateway link completion infrastructure form configuration of multi-function wireless nodes according to embodiments of the invention.

Directing attention to FIG. 7, a bridge link completion infrastructure form configuration is shown wherein multi-function wireless nodes 110*a* and 110*b* provide wireless backhaul between APs 410*a* and 410*b*. The backhaul link is preferably provided utilizing the 5 GHz band to minimize interference to the APs and provide more channel options to facilitate backhaul hub site operation.

|  | 2 Radio Multi-Function Wireless Node | 3 Radio Multi-Function Wireless Node |
| --- | --- | --- |
| Backhaul Radio | 2 802.11(n) 5 GHz radios | 3 802.11(n) 5 GHz radios |
| Access Radio | N/A | N/A |
| Fixed Beam Antenna System | 6 dual band single pole antennas (for backhaul) | 6 dual band dual pole antennas (for backhaul) 1 panel antenna (for backhaul) |
| Adaptive Beam Antenna System | 2 dual band 3 scan beam antenna sets (for backhaul) | 2 dual band 3 scan beam antenna sets (for backhaul) 1 panel antenna (for backhaul) |

Figure 8:
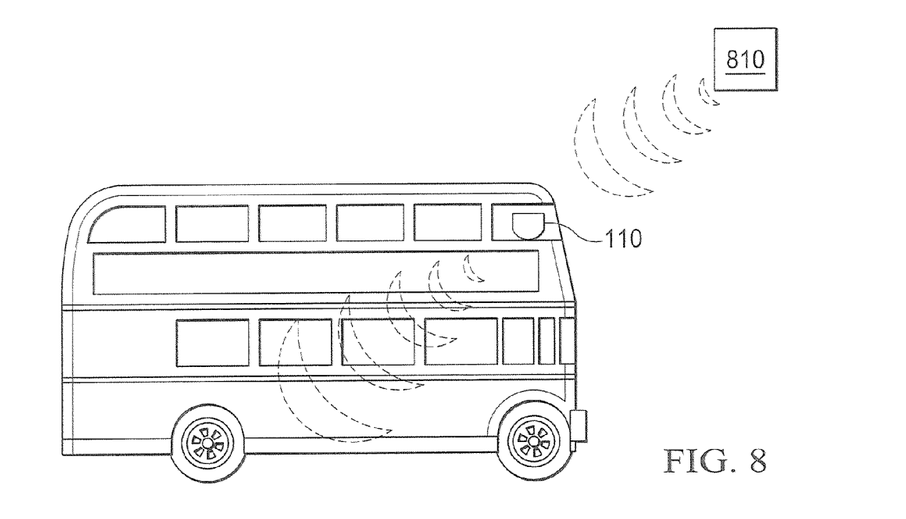
FIG. 8 shows a bridge link completion infrastructure form configuration of a multi-function wireless node according to embodiments of the invention.

Directing attention to FIG. 8, a gateway link completion infrastructure form configuration is shown providing a bridge to transform HSPA/WiMax signals provided by BS 810 (shown here disposed outside the vehicle) to WiFi signal propagated within the vehicle by multi-function wireless node 110. This configuration allows common PC/PDA clients to utilize their WiFi connectivity within a vehicle (e.g., bus, ferry, plane, train, etc.) while moving, although the infrastructure directly supported by such PC/PDA clients does not accommodate such movement. Additionally or alternatively, this configuration allows common PC/PDA clients to utilize their WiFi connectivity within an area not otherwise served by the infrastructure directly supported by such PC/PDA clients. Joint radio or multi-channel access techniques may be applied in this example for different purpose (e.g., coverage/capacity). In the illustrated example, mobile IP or other technologies are preferably applied to provide seamless roaming since the vehicle would be moving around the city.

|  | 2 Radio Multi-Function Wireless Node | 3 Radio Multi-Function Wireless Node |
| --- | --- | --- |
| Backhaul Radio | 1 external USB connected HSPA/WiMax modem | 1 external USB connected HSPA/WiMax modem |
| Access Radio | 2 802.11(n) 2.4 GHz radios | 2 802.11(n) 2.4 GHz radios 1 802.11(n) 5 GHz radios |
| Fixed Beam Antenna System | 6 dual band single pole antennas (for access) | 6 dual band single pole antennas (for access) 1 omni antenna (for access 5 GHz) |
| Adaptive Beam | 2 dual band 3 scan beam antenna sets (for access) | 2 dual band 3 scan beam antenna sets (for access) |

-continued

| | 2 Radio Multi-Function Wireless Node | 3 Radio Multi-Function Wireless Node |
|---|---|---|
| Antenna System | | 1 omni antenna (for access 5 GHz) |

It should be appreciated that configurations as set forth above may be implemented by controller 250 in response to selection of a corresponding link compliance infrastructure form and in accordance with collected environment data. The radios used with respect to particular links, the antenna beams used for the links, etc. are also preferably selected in accordance with collected environment data.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A multi-function wireless node configured to provide a plurality of selectable link completion infrastructure forms, the multi-function wireless node comprising:
   a plurality of radios, wherein the plurality of radios each provide at least one of multi-protocol operation and multi-frequency operation;
   a smart antenna system coupled to the plurality of radios and providing antenna beams for illuminating a service volume for communication via the plurality of radios; and
   a controller coupled to the smart antenna system and operable to collect communication environment data using the antenna beams and the plurality of radios and to utilize the collected communication environment data to configure the multi-function wireless node for a selected link completion infrastructure form of the plurality of link completion infrastructure forms, wherein the controller is operable to utilize at least one of information regarding communication environment protocol and communication environment frequency from the collected communication environment data to configure the multi-function wireless node, wherein each of the link completion infrastructure forms of the plurality of link completion infrastructure forms is configured to complete a wireless link between a plurality of other nodes, and wherein the plurality of link completion infrastructure forms comprise at least two link completion infrastructure forms selected from the group consisting of a repeater, a bridge, a gateway, backhaul, and an access point.

2. The multi-function wireless node of claim 1, wherein the smart antenna system is configured to provide the antenna beams to define the service volume configured so as to adequately serve each link completion infrastructure form of the plurality of selectable link completion infrastructure forms.

3. The multi-function wireless node of claim 2, wherein smart antenna system is further configured to provide the antenna beams to define the service volume configured so as to facilitate deploying the multi-function wireless node in a plurality of orientations.

4. The multi-function wireless node of claim 3, wherein the service volume comprises a semi-spherical volume which comprises a volume greater than that of a hemisphere but less than that of a sphere.

5. The multi-function wireless node of claim 3, wherein the plurality of orientations comprise an inverted orientation, a vertical orientation, a horizontal orientation, and a finial orientation.

6. The multi-function wireless node of claim 1, wherein the plurality of link completion infrastructure forms comprise a repeater, a bridge, a gateway, backhaul, and an access point.

7. The multi-function wireless node of claim 1, wherein the antenna beams provided by the smart antenna system comprise a set of a plurality of antenna beams associated with each radio of the plurality of radios.

8. The multi-function wireless node of claim 7, wherein the plurality of antenna beams of each set of the plurality of antenna beams aggregate to substantially illuminate the service volume.

9. The multi-function wireless node of claim 7, wherein the plurality of antenna beams of at least two sets of the plurality of antenna beams aggregate to substantially illuminate the service volume.

10. The multi-function wireless node of claim 7, wherein the communication environment data collected by the controller includes data collected using each antenna beam of each set of the plurality of antenna beams.

11. The multi-function wireless node of claim 7, wherein the plurality of antenna beams of a first set of the sets of a plurality of antenna beams have an orthogonal attribute with respect to the plurality of antenna beams of a second set of the sets of a plurality of antenna beams.

12. The multi-function wireless node of claim 7, wherein the plurality of antenna beams of a first set of the sets of a plurality of antenna beams have a diverse attribute with respect to the plurality of antenna beams of a second set of the sets of a plurality of antenna beams.

13. The multi-function wireless node of claim 1, wherein each radio of the plurality of radios is configured to operate in accordance with one or more widely utilized protocol.

14. The multi-function wireless node of claim 13, wherein the widely utilized protocol comprises a WiFi protocol as set forth under the Institute of Electrical and Electronic Engineers 802.11 standards.

15. The multi-function wireless node of claim 1, wherein each radio of the plurality of radios is configured to provide multi-protocol operation.

16. The multi-function wireless node of claim 15, wherein the multi-protocol operation comprises a plurality of protocols selected from the group consisting of the Institute of Electrical and Electronic Engineers 802.11(a), 802.11(b), 802.11(g), and 802.11(n) protocols.

17. The multi-function wireless node of claim 1, wherein the smart antenna system comprises a fixed antenna beam network, wherein one or more of the antenna beams for illuminating the service volume are provided by the fixed antenna beam network.

18. The multi-function wireless node of claim 1, wherein the smart antenna system comprises an adaptive antenna beam forming circuit, wherein one or more of the antenna beams for illuminating the service volume are provided by the adaptive antenna beam forming circuit.

19. The multi-function wireless node of claim 1, further comprising:
a communication interface providing one or more information communication links in addition to information communication links available through wireless links associated with the plurality of radios and the smart antenna system.

20. The multi-function wireless node of claim 19, wherein the communication interface comprises one or more non-wireless network interface.

21. The multi-function wireless node of claim 19, wherein the communication interface comprises one or more point-to-point type interface.

22. The multi-function wireless node of claim 19, wherein the communication interface comprises one or more wireless type interface.

23. A method for providing operation of a multi-function wireless node in a link completion infrastructure form of a plurality of link completion infrastructure forms, the method comprising:
scanning a plurality of antenna beams for each of a plurality of radios, wherein the plurality of radios each provide at least one of multi-protocol operation and multi-frequency operation;
collecting communication environment data for a service volume from said scanning; and
configuring one or more aspects of the multi-function wireless node for the link completion infrastructure form of the plurality of link completion infrastructure forms using the collected communication environment data, wherein the configuring utilizes at least one of information regarding communication environment protocol and communication environment frequency from the collected communication environment data to configure the multi-function wireless node, wherein each of the link completion infrastructure forms of the plurality of link completion infrastructure forms is configured to complete a wireless link between a plurality of other nodes, and wherein the plurality of link completion infrastructure forms comprise at least two link completion infrastructure forms selected from the group consisting of a repeater, a bridge, a gateway, backhaul, and an access point.

24. The method of claim 23, wherein the plurality of antenna beams comprises a set of antenna beams associated with each radio of the plurality of radios, wherein at least one set of antenna beams comprises two or more antenna beams.

25. The method of claim 24, wherein the antenna beams of each set of antenna beams aggregate to substantially illuminate the service volume.

26. The method of claim 24, wherein the antenna beams of at least two sets of antenna beams aggregate to substantially illuminate the service volume.

27. The method of claim 24, wherein the service volume comprises a semi-spherical volume which comprises a volume greater than that of a hemisphere but less than that of a sphere.

28. The method of claim 24, wherein the scanning comprises:
scanning each antenna beam of the set of antenna beams associated with each radio of the plurality of radios.

29. The method of claim 24, wherein the scanning comprises:
scanning less than all antenna beams of the set of antenna beams associated with at least one radio of the plurality of radios.

30. The method of claim 23, further comprising:
collecting additional communication environment data, the additional communication environment data being associated with a communication interface other than a communication interface provided by the plurality of antenna beams and the plurality of radios, wherein the configuring one or more aspects of the multi-function wireless node uses the collected communication environment data and the collected additional communication environment data.

31. The method of claim 23, wherein the collected communication environment data used in configuring one or more aspects of the multi-function wireless node comprises information regarding a type of node detected in the service area.

32. The method of claim 23, wherein the plurality of antenna beams for a first radio of the plurality of radios comprises a first set of antenna beams substantially illuminating the service volume and the plurality of antenna beams for a second radio of the plurality of radios comprises a second set of antenna beams substantially illuminating the service volume.

33. The method of claim 23, wherein the plurality of antenna beams for a first radio of the plurality of radios comprises a first set of antenna beams and the plurality of antenna beams for a second radio of the plurality of radios comprises a second set of antenna beams, wherein the first set of antenna beams and the second set of antenna beams aggregate to substantially illuminate the service volume.

34. The method of claim 23, wherein configuring one or more aspects of the multi-function wireless node comprises:
selecting an antenna beam subset of the first subset for use in providing information communication in the link completion infrastructure form by the first radio; and
selecting an antenna beam subset of the second subset for use in providing information communication in the link completion infrastructure form by the second radio.

35. The method of claim 23, further comprising:
selecting the link completion infrastructure form from the plurality of link completion infrastructure forms.

36. The method of claim 35, wherein the selecting the link completion infrastructure form selects the link completion infrastructure form from the group consisting of a repeater, a bridge, a gateway, a backhaul, and an access point.

37. The method of claim 35, wherein selecting the link completion infrastructure form is performed by the multi-function wireless node using the collected communication environment data.

38. The method of claim 23, further comprising:
a user providing one or more parameters for use in the configuring one or more aspects of the multi-function wireless node for the link completion infrastructure form.

39. The method of claim 38, wherein the one or more parameters includes selection of the link completion infrastructure form.

40. The method of claim 38, wherein the one or more parameters includes information facilitating selecting the link completion infrastructure form from the plurality of link completion infrastructure forms by a controller of the multi-function wireless node.

41. A multi-function wireless node configured to provide a plurality of selectable link completion infrastructure forms, the multi-function wireless node comprising:
- a plurality of radios, wherein radios of the plurality of radios each provide multi-protocol operation and multi-frequency operation;
- a smart antenna system coupled to the plurality of radios and providing antenna beams for illuminating a service volume for communication via the plurality of radios, wherein the smart antenna system is configured to provide the antenna beams to define the service volume configured so as to adequately serve each link completion infrastructure form of the plurality of selectable link completion infrastructure forms; and
- a controller coupled to the smart antenna system and operable to collect communication environment data using the antenna beams and the plurality of radios and to utilize the collected communication environment data to configure the multi-function wireless node for a selected link completion infrastructure form of the plurality of link completion infrastructure forms, and wherein the controller is operable to utilize at least one of information regarding communication environment protocol and communication environment frequency from the collected communication environment data to configure the multi-function wireless node, wherein the plurality of link completion infrastructure forms comprise at least two link completion infrastructure forms selected from the group consisting of a repeater, a bridge, a gateway, backhaul, and an access point.

42. The system of claim 41, wherein the controller is operable to select the link completion infrastructure form from the plurality of link completion infrastructure forms using the collected communication environment data.

43. The system of claim 42, wherein the operation of the controller selects the link completion infrastructure form from the group consisting of a repeater, a bridge, a gateway, a backhaul, and an access point.

44. The multi-function wireless node of claim 41, wherein the service volume comprises a semi-spherical volume which comprises a volume greater than that of a hemisphere but less than that of a sphere.

45. The multi-function wireless node of claim 41, wherein smart antenna system is further configured to provide the antenna beams to define the service volume configured so as to facilitate deploying the multi-function wireless node in a plurality of orientations.

46. The multi-function wireless node of claim 41, wherein the plurality of link completion infrastructure forms comprise a repeater, a bridge, a gateway, a backhaul, and an access point.

47. The multi-function wireless node of claim 41, wherein the antenna beams provided by the smart antenna system comprise a set of a plurality of antenna beams associated with each set of radios of the plurality of radios.

48. The multi-function wireless node of claim 47, wherein the plurality of antenna beams of each set of the plurality of antenna beams aggregate to substantially illuminate the service volume.

49. The multi-function wireless node of claim 47, wherein the controller controls the sets of antenna beams.

50. The multi-function wireless node of claim 41, wherein the multi-protocol and multi-frequency operation comprises operation in accordance with the Institute of Electrical and Electronic Engineers 802.11(a), 802.11(b), 802.11(g), and 802.11(n) protocols.

51. The multi-function wireless node of claim 41, wherein the smart antenna system comprises a fixed antenna beam network, wherein one or more of the antenna beams for illuminating the service volume are provided by the fixed antenna beam network.

52. The multi-function wireless node of claim 41, wherein the smart antenna system comprises an adaptive antenna beam forming circuit, wherein one or more of the antenna beams for illuminating the service volume are provided by the adaptive antenna beam forming circuit.

* * * * *